(12) United States Patent
Jagannatha et al.

(10) Patent No.: US 11,737,015 B2
(45) Date of Patent: Aug. 22, 2023

(54) SYSTEMS AND METHODS FOR PROVIDING NETWORK SLICE SELECTION ASSISTANCE AND ROUTE SELECTION POLICY CONFIGURATIONS IN A UNIVERSAL INTEGRATED CIRCUIT CARD

(71) Applicant: Verizon Patent and Licensing Inc., Basking Ridge, NJ (US)

(72) Inventors: Deepa Jagannatha, Bridgewater, NJ (US); Taussif Khan, Martinsville, NJ (US); Axel Hallo De Wolf, Whippany, NJ (US); Bharadwaj Vemuri, Bear, DE (US); Andrew E. Youtz, Princeton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 225 days.

(21) Appl. No.: 17/301,622

(22) Filed: Apr. 9, 2021

(65) Prior Publication Data

US 2021/0227457 A1    Jul. 22, 2021

Related U.S. Application Data

(63) Continuation of application No. 16/670,667, filed on Oct. 31, 2019, now Pat. No. 10,986,568.

(51) Int. Cl.
*H04W 4/00* (2018.01)
*H04W 48/18* (2009.01)
*H04W 8/18* (2009.01)
*H04W 8/24* (2009.01)
*H04W 84/04* (2009.01)

(52) U.S. Cl.
CPC ........... *H04W 48/18* (2013.01); *H04W 8/183* (2013.01); *H04W 8/24* (2013.01); *H04W 84/042* (2013.01)

(58) Field of Classification Search
CPC ..... H04W 8/24; H04W 84/042; H04W 8/183; H04W 8/18
USPC .................................................. 370/329, 235
See application file for complete search history.

(56) References Cited

U.S. PATENT DOCUMENTS

| | | | |
|---|---|---|---|
| 10,348,679 B2 | 7/2019 | Youtz et al. | |
| 10,425,987 B2 | 9/2019 | Yang et al. | |
| 10,520,185 B2 | 12/2019 | Sato et al. | |
| 10,582,551 B2 * | 3/2020 | Zhu | H04W 8/24 |
| 10,595,268 B2 | 3/2020 | Lee et al. | |
| 10,667,179 B1 | 5/2020 | Young et al. | |
| 10,863,556 B2 | 12/2020 | Lau et al. | |
| 10,986,567 B2 * | 4/2021 | Salkintzis | H04W 48/18 |

(Continued)

*Primary Examiner* — Marceau Milord

(57) ABSTRACT

A user device may receive information indicating that a universal integrated circuit card has been installed in the user device, where the universal integrated circuit card may store a default table that includes network slice selection assistance information used to route data from the user device to correct slices of a network. The user device may execute an application stored in the user device based on receiving a selection of the application, where execution of the application may cause data to be generated. The user device may identify a slice of the network to which to route the data based on the network slice selection assistance information included in the default table. The user device may cause the data to be routed to the slice of the network identified based on the network slice selection assistance information included in the default table.

20 Claims, 11 Drawing Sheets

(56) References Cited

U.S. PATENT DOCUMENTS

| | | |
|---|---|---|
| 10,986,568 B1* | 4/2021 | Jagannatha ............ H04W 8/183 |
| 11,172,435 B2* | 11/2021 | Wei ........................ H04W 48/18 |
| 11,528,591 B2* | 12/2022 | Zhu ........................ H04W 8/065 |
| 2015/0327207 A1 | 11/2015 | Bharadwaj |
| 2018/0310238 A1 | 10/2018 | Opsenica et al. |
| 2018/0317163 A1* | 11/2018 | Lee ........................ H04W 48/18 |
| 2018/0359795 A1 | 12/2018 | Baek et al. |
| 2019/0044980 A1* | 2/2019 | Russell ................... H04W 8/06 |
| 2019/0174299 A1 | 6/2019 | Ullah et al. |
| 2019/0174405 A1 | 6/2019 | Yang et al. |
| 2019/0174449 A1 | 6/2019 | Shan et al. |
| 2019/0182875 A1 | 6/2019 | Talebi Fard et al. |
| 2019/0191298 A1 | 6/2019 | Kim et al. |
| 2019/0223093 A1 | 7/2019 | Watfa et al. |
| 2019/0357128 A1* | 11/2019 | Casati ................... H04W 76/11 |
| 2020/0008105 A1 | 1/2020 | Cui et al. |
| 2020/0015131 A1 | 1/2020 | Ying |
| 2020/0022061 A1 | 1/2020 | Jin et al. |
| 2020/0029242 A1 | 1/2020 | Andrews et al. |
| 2020/0120487 A1 | 4/2020 | Tang |
| 2020/0120589 A1* | 4/2020 | Velev .................... H04W 60/04 |
| 2020/0178166 A1 | 6/2020 | Shimojou et al. |
| 2020/0228968 A1* | 7/2020 | Bernardos ............. H04W 8/245 |
| 2020/0322884 A1* | 10/2020 | Di Girolamo ........ H04W 48/18 |
| 2020/0351818 A1* | 11/2020 | Park ........................ H04W 4/90 |

* cited by examiner

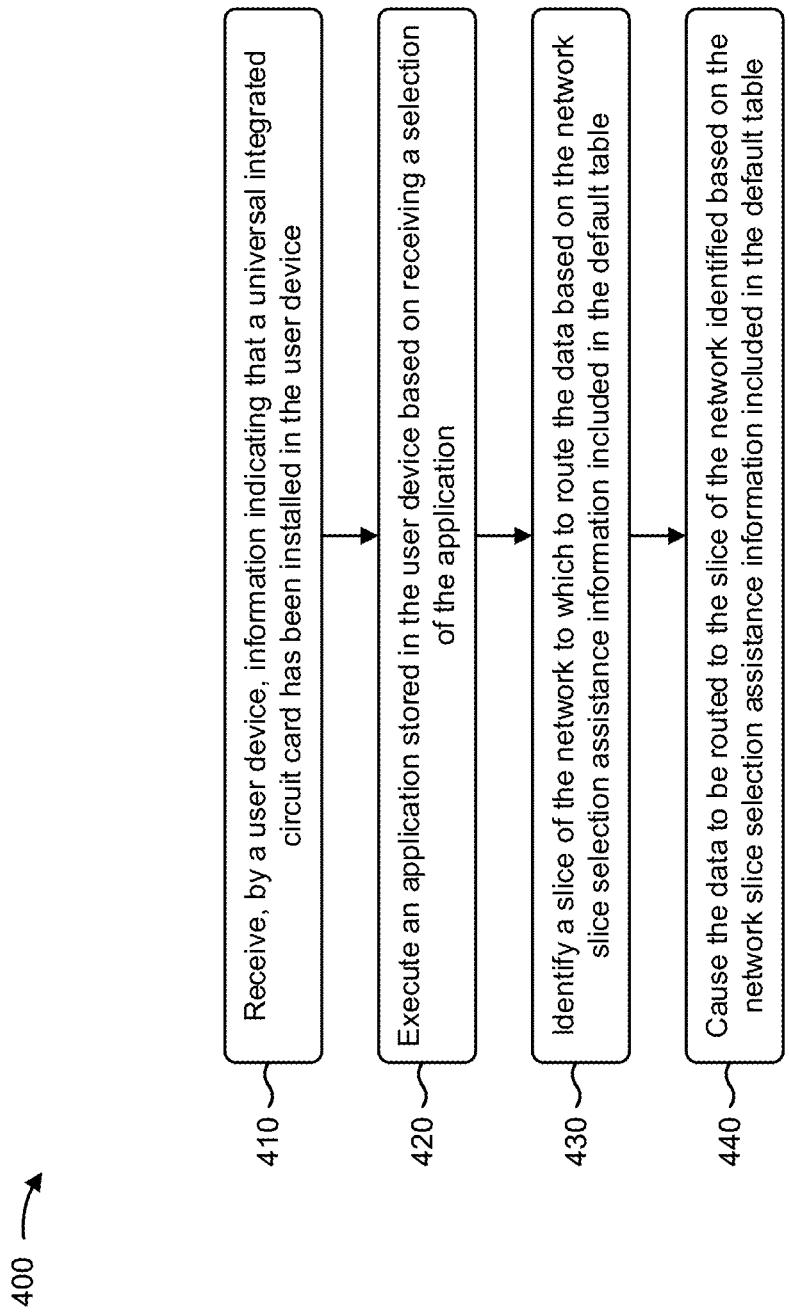

SYSTEMS AND METHODS FOR PROVIDING NETWORK SLICE SELECTION ASSISTANCE AND ROUTE SELECTION POLICY CONFIGURATIONS IN A UNIVERSAL INTEGRATED CIRCUIT CARD

RELATED APPLICATION

This application is a continuation of U.S. patent application Ser. No. 16/670,667, entitled "SYSTEMS AND METHODS FOR PROVIDING NETWORK SLICE SELECTION ASSISTANCE AND ROUTE SELECTION POLICY CONFIGURATIONS IN A UNIVERSAL INTEGRATED CIRCUIT CARD," filed Oct. 31, 2019 (now U.S. Pat. No. 10,986,568), which is incorporated herein by reference in its entirety.

BACKGROUND

Different network services require different service level agreements (e.g. different quality of service (QoS) settings) with a network. Since a fifth generation (5G) network is intended to support a very diverse set of services (e.g., from extremely low latency services to ultra-reliable services), a mechanism is required to allow a 5G network to accommodate different service levels requirements. A 5G network may utilize network slicing as the standardizing mechanism.

BRIEF DESCRIPTION OF THE DRAWINGS

FIG. 4 is a flow chart of an example process for providing default network slice selection assistance information and user equipment route selection policy configurations in a universal integrated circuit card.

DETAILED DESCRIPTION OF PREFERRED EMBODIMENTS

Figure 1A:
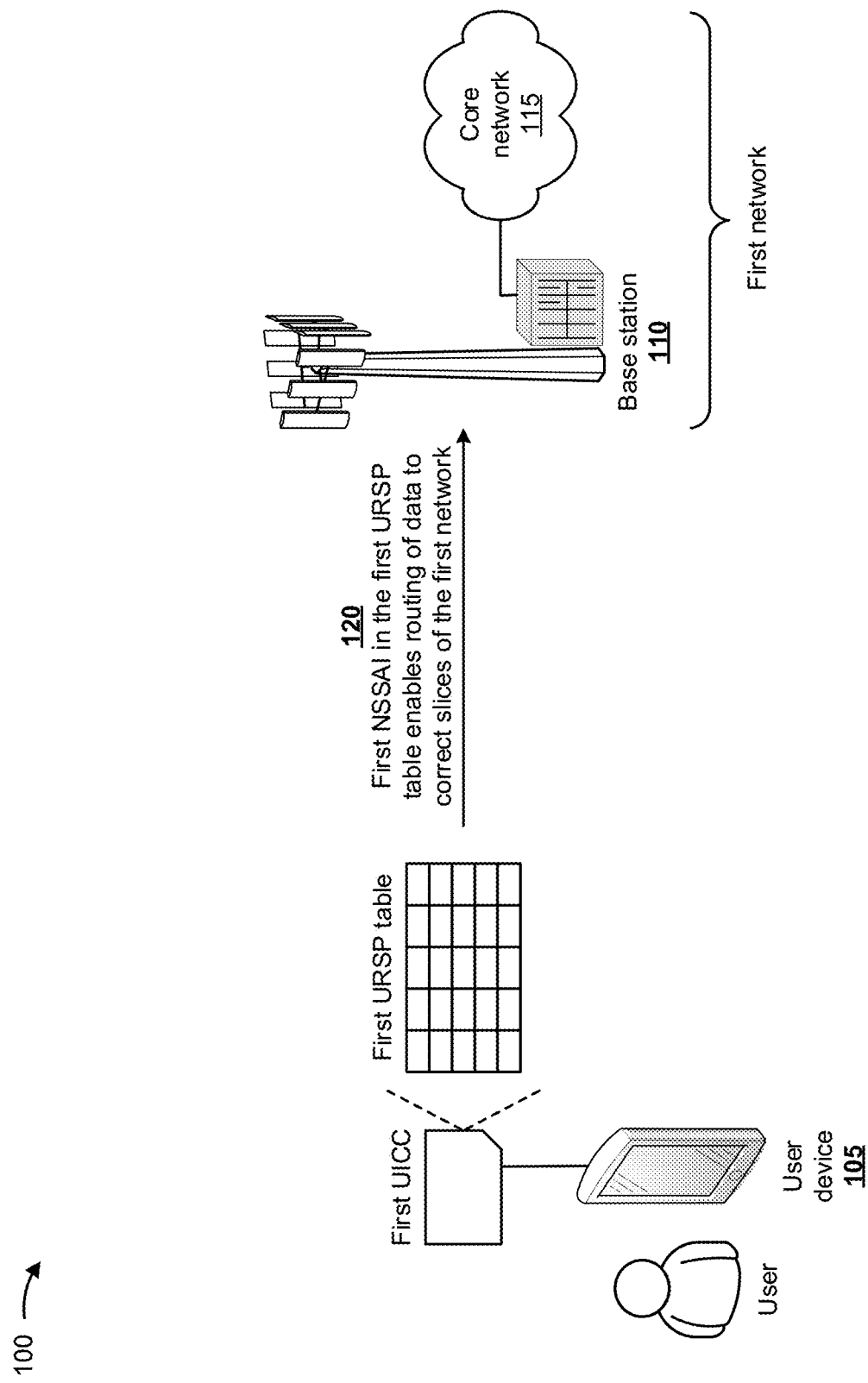
FIGS. 1A-1H are diagrams of one or more example implementations described herein.

The following detailed description of example implementations refers to the accompanying drawings. The same reference numbers in different drawings may identify the same or similar elements.

Network slicing enables creation of tailored networks, where virtual networks, or slices, are implemented on a single physical network, with each slice targeting a specific set of services, devices, customers, and/or the like. A 5G network provides an end-to-end framework for network slicing by allowing a user device (e.g., a user equipment or UE) to connect concurrently to a number of slices (e.g., up to eight slices). Each slice is identified by network slice selection assistance information (NSSAI) included in a UE route selection policy (URSP) table. The user device uses the URSP table to determine how to route data to a correct slice depending on a service utilized by the user device. The URSP table may be stored in non-volatile memory of the user device or may be signaled from the 5G network to the user device.

When different users (e.g., a first user and a second user) utilize a user device, each user may utilize a different universal integrated circuit card (UICC). For example, the first user may remove a first UICC (e.g., associated with the first user) so that the second user may install a second UICC (e.g., associated with the second user) and utilize the user device. When the second user installs the second UICC, the user device will automatically delete the URSP table, with the NSSAI, from the non-volatile memory of the user device. Since the NSSAI is deleted from the user device when the second UICC is installed, the user device has to obtain the NSSAI via signaling with the 5G network. This can create a long delay in setting up the user device and wastes computing resources (e.g., processing resources, memory resources, and/or the like), communication resources, networking resources, and/or the like associated with signaling the NSSAI from the 5G network to the user device. Additionally, when the second UICC is installed, the user device cannot map applications (e.g., executing on the user device) to types of services required from the 5G network and cannot verify that types of services are appropriate for the applications. For example, if the second user has not paid for an application that requires low latency services, the user device may not be assigned a low latency slice for the application.

Some implementations described herein provide a user device (e.g., a user equipment or UE) that provides default network slice selection assistance information (NSSAI) and UE route selection policy (URSP) configurations in a universal integrated circuit card (UICC). For example, the user device may receive information indicating that a universal integrated circuit card has been installed in the user device, where the universal integrated circuit card may store a default table that includes network slice selection assistance information, and where the network slice selection assistance information may be used to route data from the user device to correct slices of a network associated with the user device. The user device may receive a selection of an application stored in the user device, and may execute the application based on receiving the selection of the application, wherein execution of the application may cause data to be generated. The user device may identify a slice of the network to which to route the data based on the network slice selection assistance information included in the default table, and may cause the data to be routed to the slice of the network identified based on the network slice selection assistance information included in the default table.

In this way, the user device provides a default URSP table, in a newly installed UICC, that properly maps application service requests to an appropriate slice of the 5G network. When the new UICC is installed, the user device will have the default URSP table containing all necessary slicing information for network-provided services. This conserves computing resources (e.g., processing resources, memory resources, and/or the like), communication resources, networking resources and/or the like that would otherwise be wasted in signaling the NSSAI from the 5G network to the user device and setting up the URSP with the NSSAI received from the 5G network. Additionally, the newly installed UICC may include a mapping between network services and applications permitted to utilize the network services.

FIGS. 1A-1H are diagrams of one or more example implementations 100 described herein. As shown in FIG. 1A, a user device 105 and a user may be associated with a base station 110 and a core network 115 of a first network. The first network may provide multiple network slices, and each network slice may provide one or more services associated with the first network. The one or more services may be accessed by one or more applications executing on user device 105. The first network may include a base station 110 connected with a core network 115. Base station 110 may communicate with a user device 105 using a cellular radio access technology (RAT), and core network 115 may include a 5G next generation (NG) core network included in a 5G wireless telecommunications system.

As further shown in FIG. 1A, user device 105 may include a first universal integrated circuit card (UICC). The first UICC may be associated with the user, may be associated with the first network, may have been installed within user device 105 by the user, by an employer of the user (e.g., when setting up, for the user and user device 105, services associated with the first network), by a third party, and/or the like. The first UICC may store a first UE route selection policy (URSP) table. User device 105 may reference the first URSP table to determine how to correctly route data (e.g., data generated by applications executing on user device 105) from user device 105 to correct network slices (e.g., correct services) associated with the first network. The first URSP table may include first network slice selection assistance information (NSSAI) that identifies network slices of the first network. As further shown in FIG. 1A, and by reference number 120, first NSSAI in the first URSP table may enable routing of data to correct network slices of the first network.

Figure 1B:
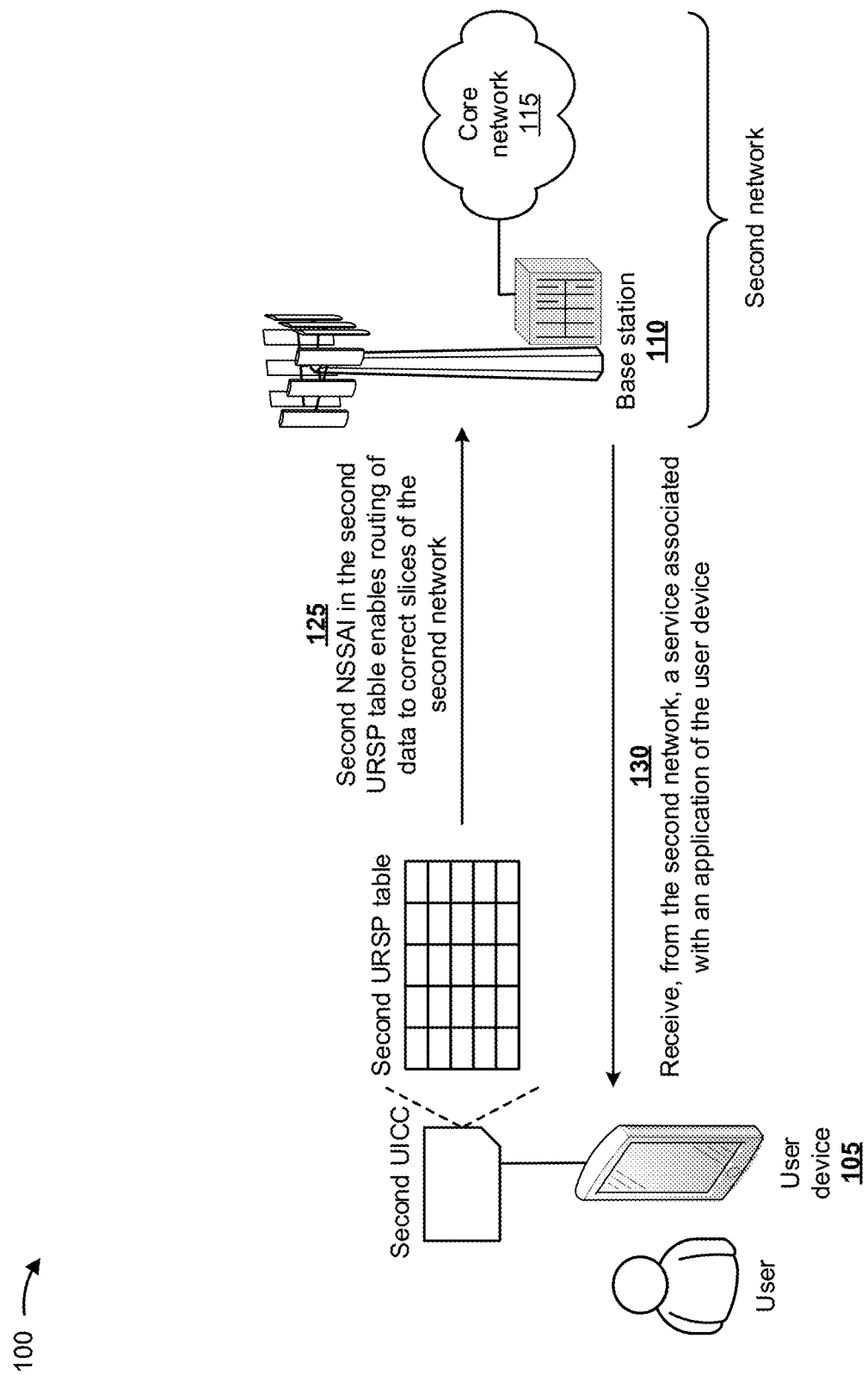

As shown in FIG. 1B, the first UICC may be removed from user device 105 and replaced with a second UICC that is installed within user device 105. The second UICC may be associated with the same user as the user associated with the first UICC (e.g., where the user switches user device 105 from a first network to a second network, where the user utilizes user device 105 with the first network for personal use and the second network for work use, where the user utilizes user device 105 with the first network for both personal use and work use, and/or the like), or may be associated with a different user (e.g., where the user shares user device 105 with the different user, such as another employee at an employer of the user, another family member of the user's family, and/or the like; where the different user utilizes the first network with the second UICC or utilizes the second network with the second UICC; and/or the like). As further shown in FIG. 1B, user device 105 and the second UICC may be associated with a base station 110 and a core network 115 of a second network, and the second UICC may store a second URSP table (e.g., that is preinstalled on the second UICC by a provider of the second UICC, such as an entity associated with the second network). User device 105 may reference the second URSP table to determine how to correctly route data (e.g., data generated by applications executing on user device 105) from user device 105 to correct network slices (e.g., correct services) associated with the second network. In some implementations, the second URSP table may not enable user device 105 to route data to correct network slices associated with the first network.

When the second UICC is installed, user device 105 may receive information indicating that the second UICC has been installed and may configure user device 105 with the second URSP table stored on the second UICC. The second URSP table may include a default URSP table that is immediately available to user device 105 and associated with network slices and services provided by the second network. For example, user device 105 may immediately utilize the second URSP table to route data from user device 105 to correct network slices associated with the second network, without requiring information associated with the network slices to be signaled from the second network to user device 105. The second URSP table may include second NSSAI that identifies network slices of the second network.

In some implementations, the second URSP table may be stored in non-volatile memory (e.g., memory that can retrieve stored information even after having been power cycled) of user device 105, may be stored in a particular file directory (e.g., a universal subscriber identity module (USIM) directory) associated with the second UICC, and/or the like.

As further shown in FIG. 1B, and by reference number 125, the second NSSAI in the second URSP table may enable routing of data to correct network slices of the second network. For example, user device 105 may execute an application that generates data for a network slice (e.g., a service) of the second network. User device 105 may identify the network slice of the second network to which to route the data based on the NSSAI included in the second URSP table. In some implementations, when the application executes, user device 105 may generate a request to compare information identifying the application (e.g., an application identifier, information identifying a type of application, information identifying a class of application with respect to a quality of service to be received by the application, and/or the like) and the NSSAI included in the second URSP table, and may compare the information identifying the application and the NSSAI based on the request. User device 105 may determine, based on a result of the comparing, that the information identifying the application matches particular NSSAI included in the second URSP table. The particular NSSAI may be mapped to information identifying a network slice, of the second network, to which to route data generated based on execution of the application. In some implementations, user device 105 may cause the data to be routed to the network slice, of the second network, that is identified based on the particular NSSAI included in the second URSP table.

As further shown in FIG. 1B, and by reference number 130, user device 105 may receive, from the second network (e.g., from the network slice of the second network), a service associated with the application executed by user device 105. In some implementations, the second URSP table may include a mapping between information identifying the network slices of the second network, services provided by the network slices of the second network, and applications of user device 105 that are permitted to utilize the services provided by the network slices of the second network. User device 105 may use the mapping to permit an application executing on user device 105 to utilize the service received from the second network. User device 105 may receive the service and may provide the service to the application.

Although implementations described herein relate to providing NSSAI in the second URSP table, in some implementations the second URSP table may include access point name (APN) information. When user device 105 receives an application or a service from the second network, user device 105 may need to connect to a network device associated with the application or the service. User device 105 may store, in the second URSP table, an APN table with APNs that correspond to particular network devices of the second network, and may use the APN table to perform APN management. When the second UICC is installed in user device 105, user device 105 may be configured with the APN table, and the APN table may be immediately utilized by user device 105 to perform APN management, without requiring user device 105 to receive APN information from the second network.

Figure 1C:
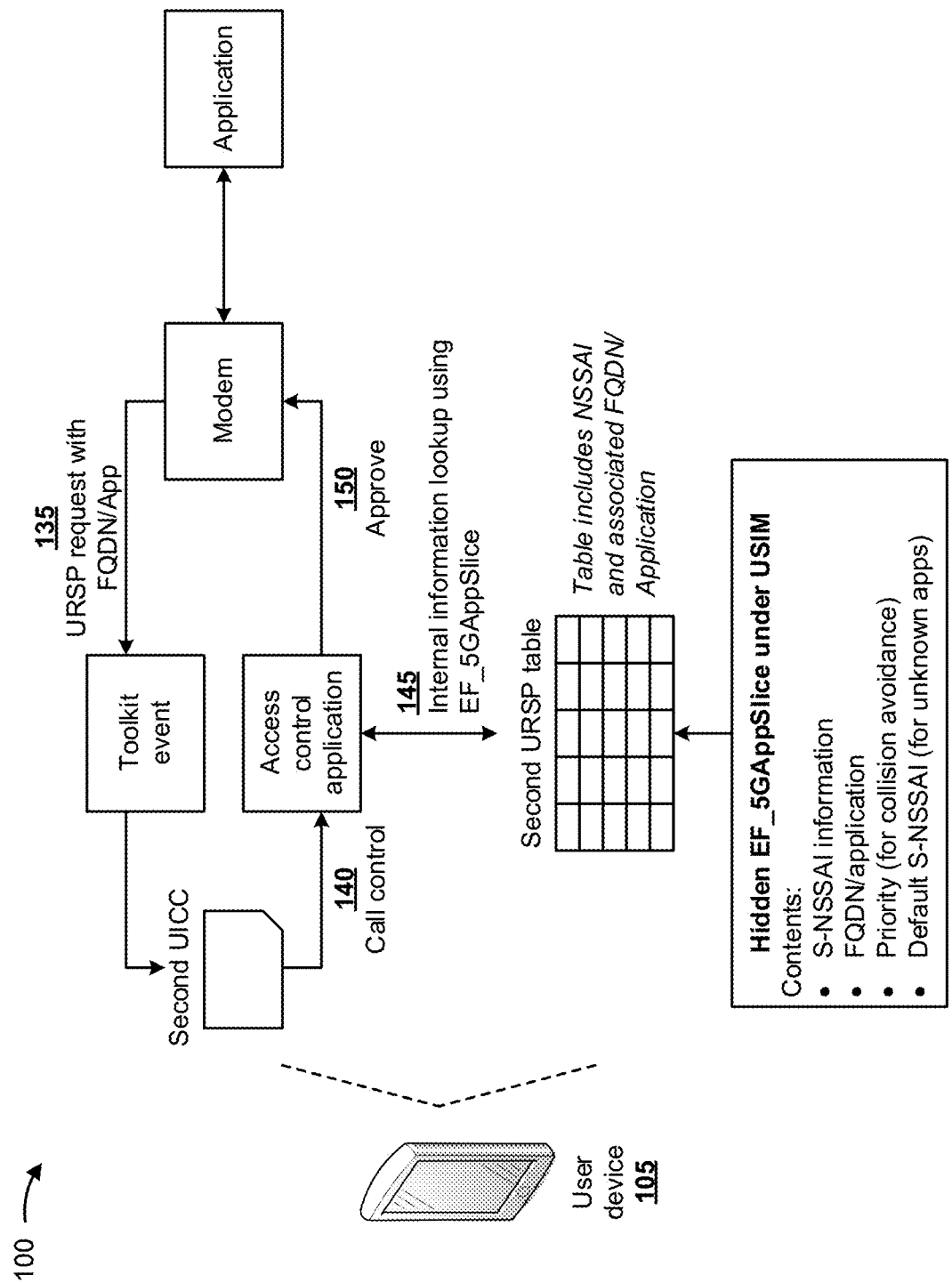

As shown in FIG. 1C, user device 105 may verify that an application requesting a service (e.g., provided by the second network) is permitted to utilize the service based on being assigned a network slice (e.g., in the second NSSAI) associated with the service. In some implementations (e.g., if user device 105 includes software that decodes and routes information, such as call control), user device 105 may utilize call control messaging to verify that an application requesting a service is permitted to utilize the service, and may identify a network slice of the second network to which to route the data based on verifying that the application is permitted to access the service provided by the network slice of the second network.

As further shown in FIG. 1C, and shown by reference number 135, the application may cause a modem on user device 105 to send a request for an approval of the application (e.g., a URSP request that includes information identifying the application, such as a fully qualified domain name (FQDN) associated with the application) to a toolkit event application of user device 105 that provides the request to the second UICC. As shown by reference number 140, the second UICC may perform call control for the request via an access control application of user device 105. As shown by reference number 145, the access control application may perform an internal information lookup of the second URSP table based on the information identifying the application. The second URSP table may include the information (e.g., the FQDN) identifying the application, and a single NSSAI (S-NSSAI) (e.g., NSSAI corresponding to a single network slice) that is mapped to the information identifying the application. Based on the internal information lookup, the access control application may determine that the application is approved to utilize the network slice of the second network. As further shown in FIG. 1C, and by reference number 150, the access control application may provide, to the modem, information indicating that the application is approved to utilize the network slice of the second network. The modem may permit the application to utilize the network slice of the second network based on the approval.

Figure 1D:
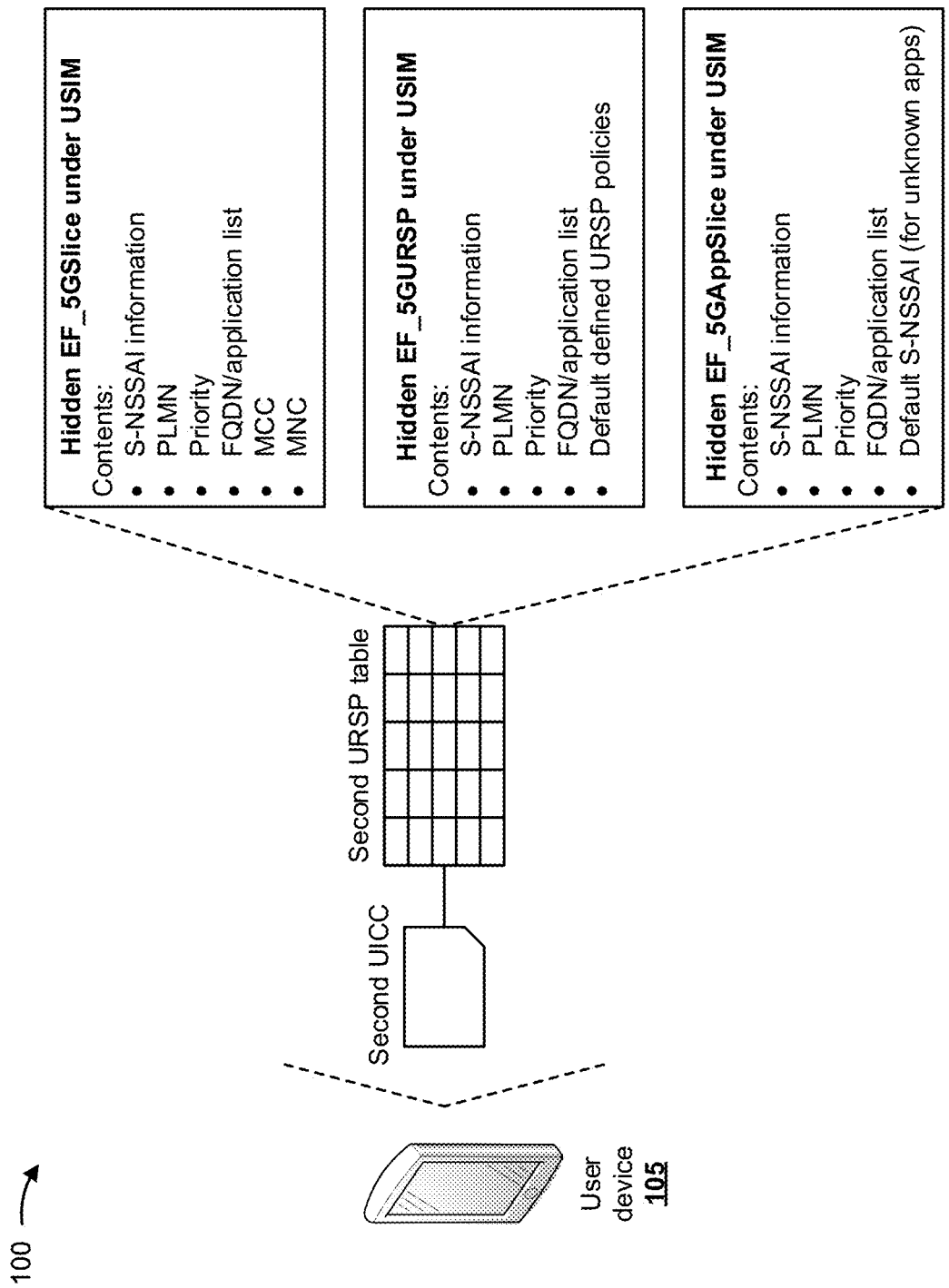

As shown in FIG. 1D, the second URSP table may include multiple files (e.g., tables) that include the NSSAI and other information associated with the second network. For example, the second URSP may include a file that includes NSSAI associated with the second network, a file that includes user equipment route selection policies associated with the second network, a file that includes a mapping between information identifying network slices of the second network and information identifying applications of user device 105, and/or the like. As further shown in FIG. 1D, the second URSP may include a network slice elementary file (EF) (e.g., EF_5GSlice), a URSP elementary file (e.g., EF_5GURSP), an application slice elementary file (e.g., EF_5GAppSlice), and/or the like. The network slice elementary file may include S-NSSAI information, a public land mobile network (PLMN) identifier, a priority indicator, a list of FQDNs associated with applications, a mobile country code (MCC), a mobile network code (MNC), and/or the like. The URSP elementary file may include S-NSSAI information, a PLMN identifier, a priority indicator, a list of FQDNs associated with applications, default defined URSP policies, and/or the like. The application slice elementary file may include S-NSSAI information, a PLMN identifier, a priority indicator, a list of FQDNs associated with applications, default S-NSSAI for unknown applications, and/or the like. In some implementations, the network slice elementary file, the URSP elementary file, and the application slice elementary file may be hidden files (e.g., under the USIM directory).

In some implementations, the modem of user device 105 (e.g., as shown in FIG. 1C) may read information from the network slice elementary file, the URSP elementary file, and/or the application slice elementary file, and may store the information locally for use when requesting services on PLMNs listed in the second URSP table. In some implementations, the second network (e.g., via a subscriber identity module (SIM) over-the-air (OTA) device of the second network) may provide updates related to the second URSP table and/or the NSSAI associated with the second URSP. For example, the second network may update information included in the network slice elementary file, the URSP elementary file, and/or the application slice elementary file may be updated.

Figure 1E:
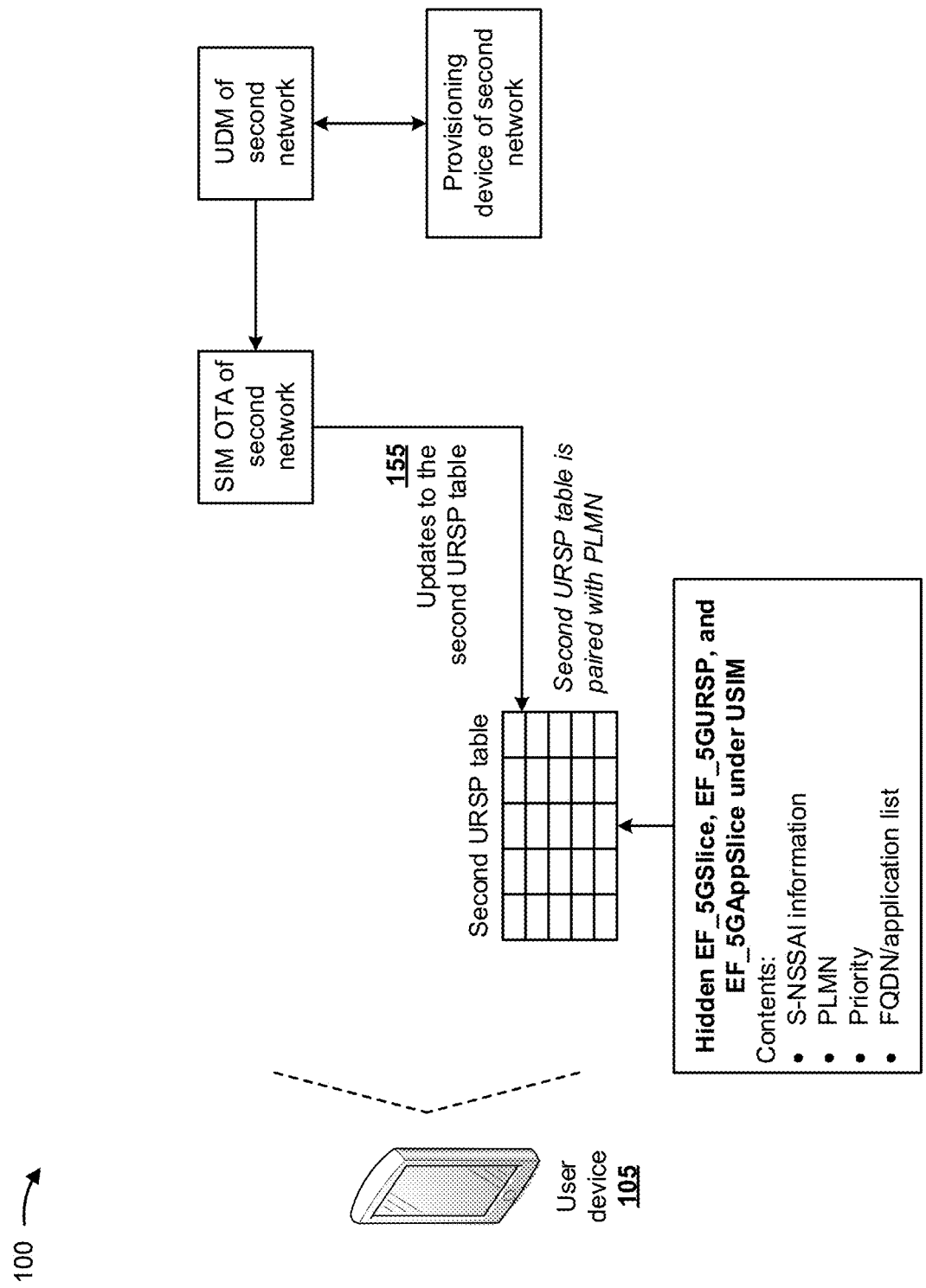

As shown in FIG. 1E, and by reference number 155, user device 105 may receive, from the second network, updates to the second URSP table (e.g., updated information for the NSSAI included in the second URSP table). For example, a provisioning device of the second network may provide, to a unified data management (UDM) component of the second network, the updates to the second URSP. The UDM component may provide the updates to the second URSP to a SIM OTA of the second network, and the SIM OTA may provide the updates to the second URSP to user device 105. User device 105 may update the second URSP table based on the updates to the second URSP. For example, user device 105 may update information (e.g., the S-NSSAI information, the PLMN identifiers, the priority indicators, and/or the like) included in the network slice elementary file, the URSP elementary file, and/or the application slice elementary file based on the updates to the second URSP. The updates to the second URSP may be implemented via a bearer independent protocol (BIP), a short message service (SMS), and/or the like.

Figure 1F:
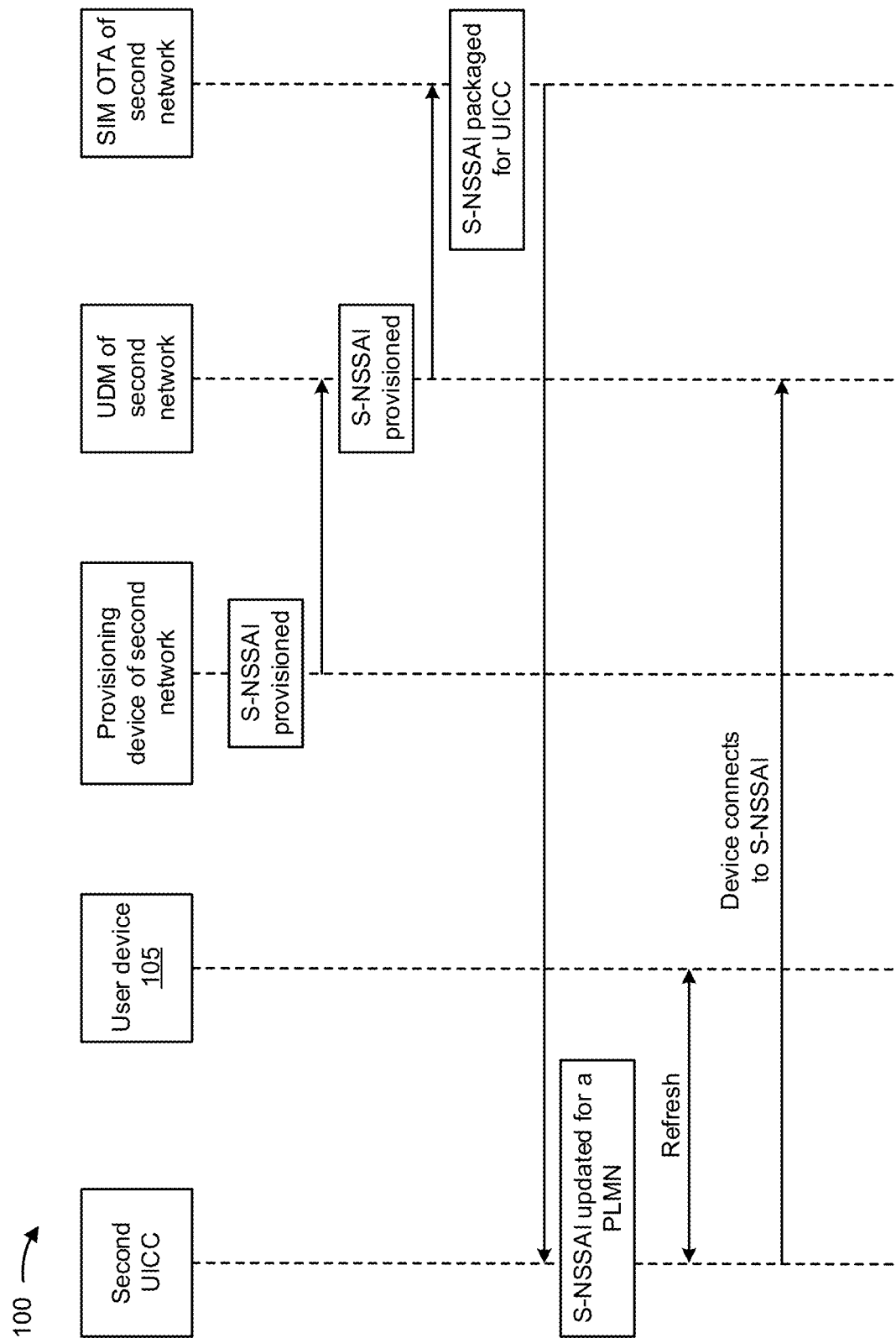

FIG. 1F depicts a signaling flow diagram associated with updating the second UICC (e.g., the second URSP) with new NSSAI information. As shown in FIG. 1F, the provisioning device of the second network may provision new S-NSSAI, and may provide the provisioned S-NSSAI to the UDM component of the second network. The UDM component may provide the S-NSSAI to the SIM OTA of the second network. The SIM OTA may package the S-NSSAI for the second UICC, and may provide the packaged S-NSSAI to the second UICC. The second UICC may update the S-NSSAI for a PLMN in the network slice elementary file, the URSP elementary file, and/or the application slice elementary file, and may cause user device 105 to refresh the second UICC. Thereafter, the second UICC may communicate with the UDM component so that user device 105 may connect to the second network based on the new S-NSSAI. In some implementations, the signaling flow described above may be applied to push updating, to adding URSP policies to the UICC, and/or the like.

In some implementations, when the second network provides NSSAI and/or URSP information to user device 105, the second network may utilize a policy control function (PCF) and/or an access and mobility management function (AMF) to send subscribed NSSAI and/or configured NSSAI in a non-access stratum (NAS) configuration update command to user device 105. Subscribed NSSAI and/or configured NSSAI may also be pre-configured in user device 105 at a factory, by a user, and/or the like.

In some implementations, user device 105 may store the configured NSSAI until a newly configured NSSAI is received (e.g., for a PLMN). For example, the second network may provide, to user device 105, a mapping of each S-NSSAI of a newly configured NSSAI to the S-NSSAI of a configured NSSAI for a home public land mobile network (HPLMN) which may be stored in user device 105. When user device 105 is provisioned with a newly configured NSSAI for a PLMN, the user device 105 may update the second URSP table, as described below in connection with FIG. 1H.

Figure 1G:
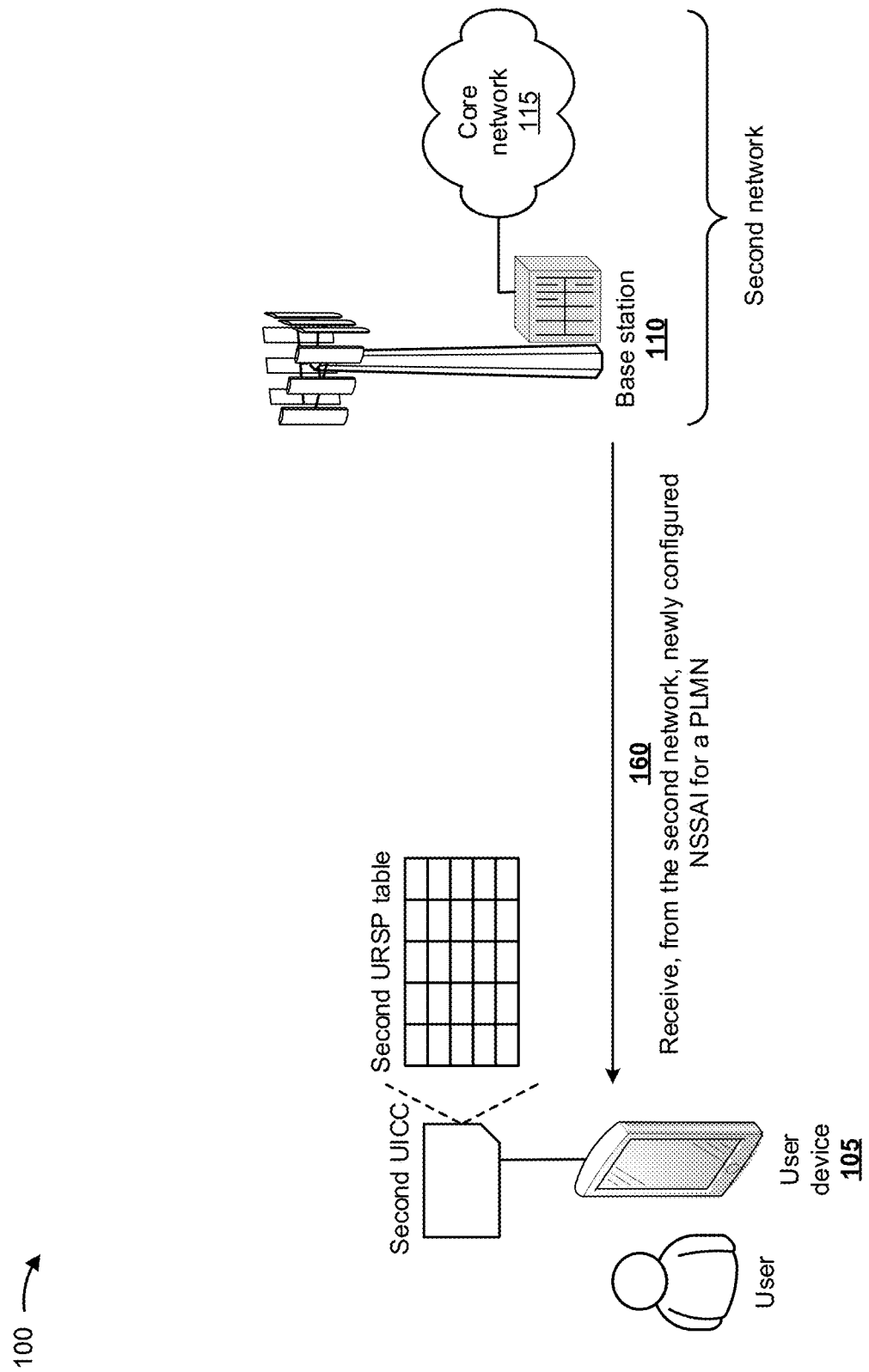

As shown in FIG. 1G, and by reference number 160, user device 105 may receive, from the second network, newly configured NSSAI for a PLMN of the second network. In some implementations, user device 105 may add the newly configured NSSAI for the PLMN to the second URSP table stored in the second UICC. In some implementations, user device 105 may perform one or more of the actions described below in connection with FIG. 1H based on receiving the newly configured NSSAI for the PLMN.

Figure 1H:
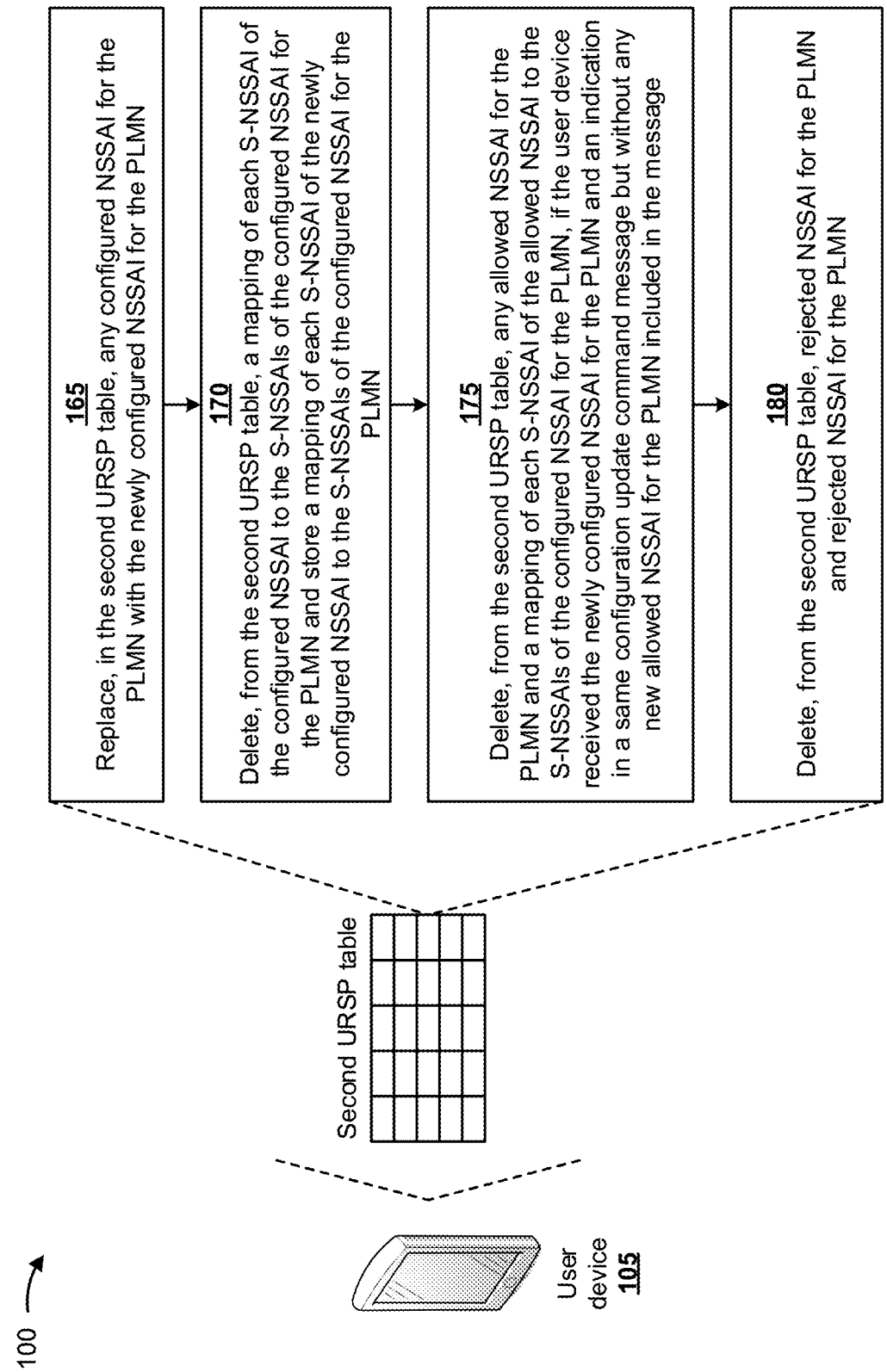

As shown in FIG. 1H, and by reference number 165, user device 105 may, based on receiving the newly configured NSSAI for the PLMN of the second network, replace, in the second URSP table, any configured NSSAI for the PLMN with the newly configured NSSAI for the PLMN.

In some implementations, as further shown in FIG. 1H and by reference number 170, user device 105 may delete, from the second URSP table, a mapping of each S-NSSAI of the configured NSSAI to the S-NSSAIs of the configured NSSAI for the PLMN. User device 105 may store a mapping of each S-NSSAI of the newly configured NSSAI to the S-NSSAIs of the configured NSSAI for the PLMN.

In some implementations, as further shown in FIG. 1H and by reference number 175, user device 105 may delete, from the second URSP table, any allowed NSSAI for the PLMN and a mapping of each S-NSSAI of the allowed NSSAI to the S-NSSAIs of the configured NSSAI for the PLMN, if user device 105 received the newly configured NSSAI for the PLMN and an indication (e.g., registration request indication) in a same configuration update command message but without any new allowed NSSAI for the PLMN included in the message.

In some implementations, as further shown in FIG. 1H and by reference number 180, user device 105 may delete, from the second URSP table, rejected NSSAI for the PLMN and rejected NSSAI for the PLMN.

In this way, user device 105 provides a default URSP table, in a newly installed UICC, that properly maps application service requests to an appropriate slice of the 5G network. When the new UICC is installed, user device 105 will have the default URSP table containing all necessary slicing information for network-provided services. This conserves computing resources (e.g., processing resources, memory resources, and/or the like), communication resources, networking resources, and/or the like that would otherwise be wasted in signaling the NSSAI from the 5G network to user device 105 and setting up the URSP with the NSSAI received from the 5G network. Additionally, the newly installed UICC may include a mapping between network services and applications permitted to utilize the network services.

As indicated above, FIGS. 1A-1H are provided merely as examples. Other examples may differ from what was described with regard to FIGS. 1A-1H. The number and arrangement of devices and networks shown in FIGS. 1A-1H are provided as an example. In practice, there may be additional devices and/or networks, fewer devices and/or networks, different devices and/or networks, or differently arranged devices and/or networks than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) of FIGS. 1A-1H may perform one or more functions described as being performed by another set of devices of FIGS. 1A-1H.

Figure 2:
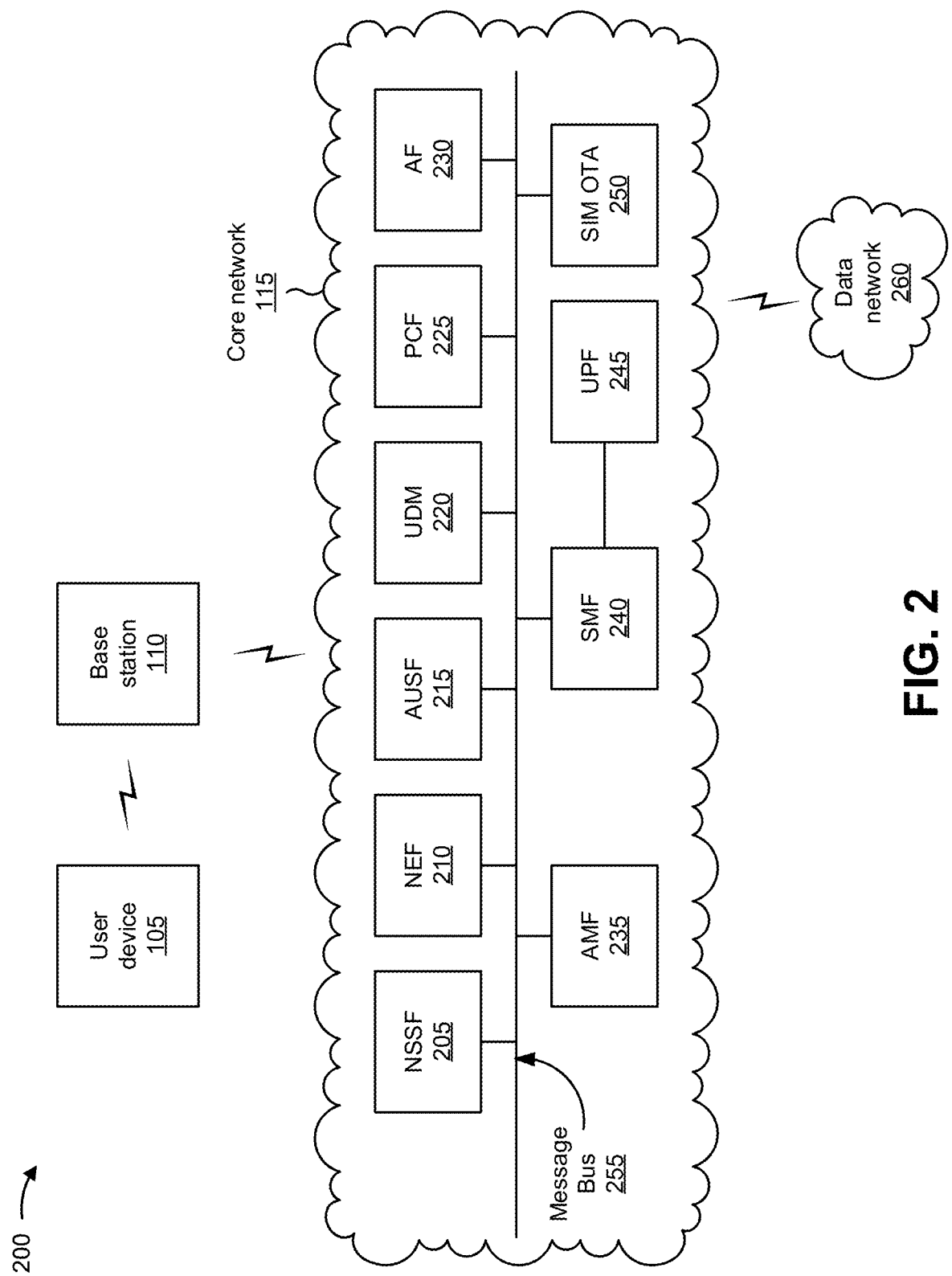
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include user device 105, base station 110, core network 115, and a data network 260. Devices and/or networks of example environment 200 may interconnect via wired connections, wireless connections, or a combination of wired and wireless connections.

User device 105 includes one or more devices capable of receiving, generating, storing, processing, and/or providing information, such as information described herein. For example, user device 105 can include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, etc.), a mobile hotspot device, a fixed wireless access device, customer premises equipment, an autonomous vehicle, or a similar type of device.

Base station 110 includes one or more devices capable of communicating with user device 105 using a cellular radio access technology (RAT). For example, base station 110 may include a base transceiver station, a radio base station, a node B, an eNodeB (eNB), a gNodeB (gNB), a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. Base station 110 may transfer traffic between user device 105 (e.g., using a cellular RAT), other base stations 110 (e.g., using a wireless interface or a backhaul interface, such as a wired backhaul interface), and/or core network 115. Base station 110 may provide one or more cells that cover geographic areas. Some base stations 110 may be mobile base stations. Some base stations 110 may communicate using multiple RATs.

In some implementations, base station 110 may perform scheduling and/or resource management for user devices 105 covered by base station 110 (e.g., user devices 105 covered by a cell provided by base station 110). In some implementations, base station 110 may be controlled or coordinated by a network controller, which may perform load balancing, network-level configuration, and/or the like. The network controller may communicate with base station 110 via a wireless or wireline backhaul. In some implementations, base station 110 may include a network controller, a self-organizing network (SON) module or component, or a similar module or component. In other words, base station 110 may perform network control, scheduling, and/or network management functions (e.g., for other base stations 110 and/or for uplink, downlink, and/or sidelink communications of user devices 105 covered by the base station 110). In some implementations, base station 110 may include a central unit and multiple distributed units. The central unit may coordinate access control and communication with regard to the multiple distributed units. The multiple distributed units may provide user devices 105 and/or other base stations 110 with access to data network 260 via the core network.

In some implementations, core network 115 may include an example functional architecture in which systems and/or methods, described herein, may be implemented. For example, core network 115 may include an example architecture of a 5G next generation (NG) core network included in a 5G wireless telecommunications system. While the example architecture of core network 115 shown in FIG. 2 may be an example of a service-based architecture, in some implementations, core network 115 may be implemented as a reference-point architecture.

As shown in FIG. 2, core network 115 may include a number of functional elements. The functional elements may include, for example, a network slice selection function (NSSF) 205, a network exposure function (NEF) 210, an authentication server function (AUSF) 215, a unified data management (UDM) component 220, a policy control function (PCF) 225, an application function (AF) 230, an access and mobility management function (AMF) 235, a session management function (SMF) 240, a user plane function (UPF) 245, a subscriber identity module (SIM) over-the-air (OTA) device 250, and/or the like. These functional elements may be communicatively connected via a message bus 255. Each of the functional elements shown in FIG. 2 is implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment.

NSSF 205 includes one or more devices that select network slice instances for user device 105. By providing network slicing, NSSF 205 allows an operator to deploy multiple substantially independent end-to-end networks potentially with the same infrastructure. In some implementations, each slice may be customized for different services.

NEF 210 includes one or more devices that support exposure of capabilities and/or events in the wireless telecommunications system to help other entities in the wireless telecommunications system discover network services.

AUSF 215 includes one or more devices that act as an authentication server and support the process of authenticating user devices 105 in the wireless telecommunications system.

UDM 220 includes one or more devices that store user data and profiles in the wireless telecommunications system. UDM 220 may be used for fixed access, mobile access, and/or the like, in core network 115.

PCF 225 includes one or more devices that provide a policy framework that incorporates network slicing, roaming, packet processing, mobility management, and/or the like.

AF 230 includes one or more devices that support application influence on traffic routing, access to NEF 210, policy control, and/or the like.

AMF 235 includes one or more devices that act as a termination point for non-access stratum (NAS) signaling, mobility management, and/or the like.

SMF 240 includes one or more devices that support the establishment, modification, and release of communications sessions in the wireless telecommunications system. For example, SMF 240 may configure traffic steering policies at UPF 245, enforce user device IP address allocation and policies, and/or the like.

UPF 245 includes one or more devices that serve as an anchor point for intraRAT and/or interRAT mobility. UPF 245 may apply rules to packets, such as rules pertaining to packet routing, traffic reporting, handling user plane QoS, and/or the like.

SIM OTA device 250 includes one or more devices, such as computing devices and/or server devices, that perform OTA activation and/or OTA updates for a UICC installed in user device 105. For example, SIM OTA device 250 may authenticate the UICC via an access network provided by base station 110 and/or may provide an assigned telephone number to the UICC. In some implementations, SIM OTA device 250 may provide updates, new information, and/or the like to NSSAI and/or URSP configurations stored in the UICC of user device 105.

Message bus 255 represents a communication structure for communication among the functional elements. In other words, message bus 255 may permit communication between two or more functional elements.

Data network 260 includes one or more wired and/or wireless data networks. For example, data network 260 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
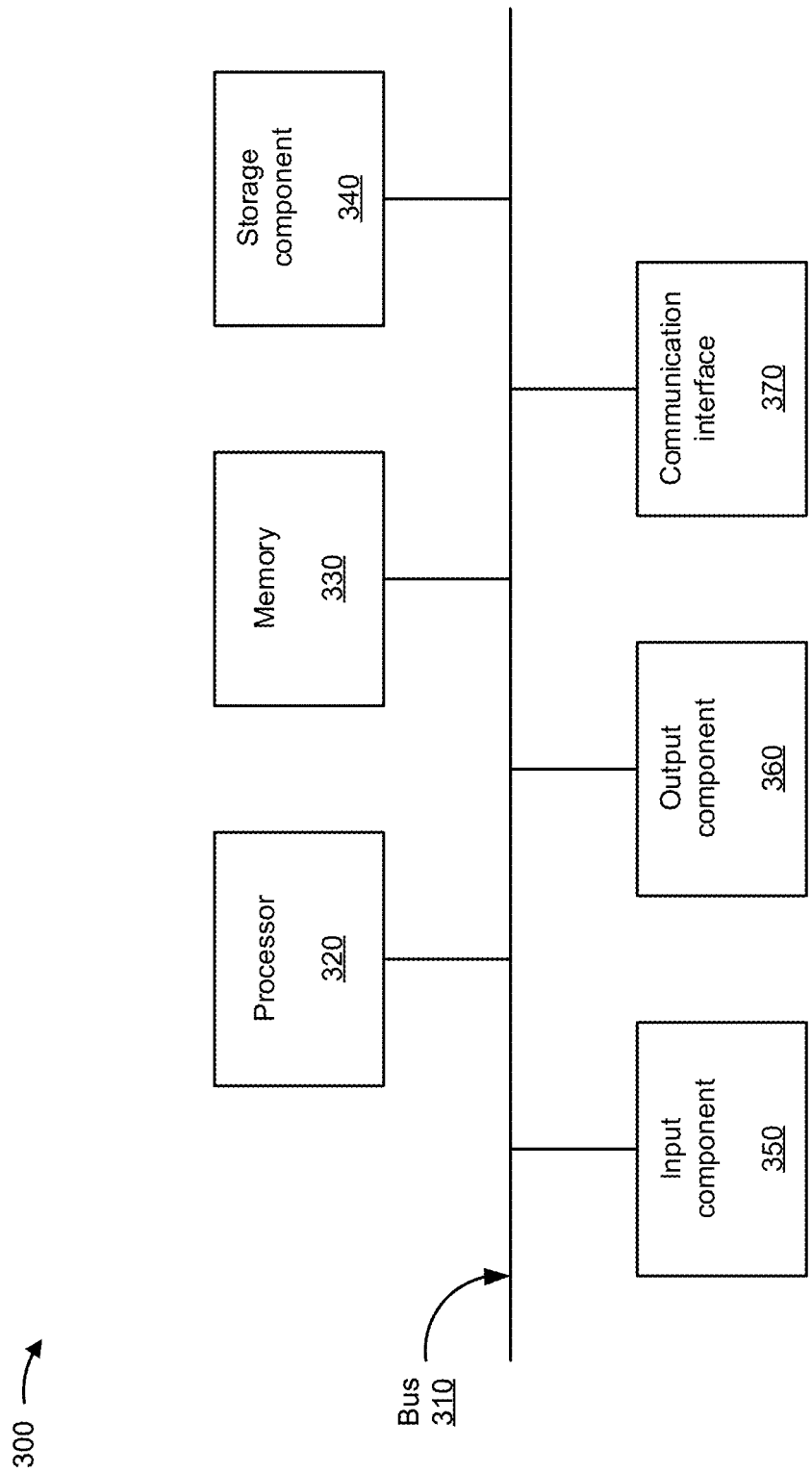
FIG. 3 is a diagram of example components of one or more devices of FIG. 2.

FIG. 3 is a diagram of example components of a device 300. Device 300 may correspond to user device 105, base station 110, NSSF 205, NEF 210, AUSF 215, UDM 220, PCF 225, AF 230, AMF 235, SMF 240, UPF 245, and/or SIM OTA device 250. In some implementations, user device 105, base station 110, NSSF 205, NEF 210, AUSF 215, UDM 220, PCF 225, AF 230, AMF 235, SMF 240, UPF 245, and/or SIM OTA device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for providing default network slice selection assistance information and user equipment route selection policy configurations in a universal integrated circuit card. In some implementations, one or more process blocks of FIG. 4 may be performed by a user device (e.g., user device 105). In some implementations, one or more process blocks of FIG. 4 may be performed by another device or a group of devices separate from or including the user device, such as a NSSF (e.g., NSSF 205) and/or a UDM (e.g., UDM 220).

As shown in FIG. 4, process 400 may include receiving information indicating that a universal integrated circuit card has been installed in the user device (block 410). For example, the user device (e.g., using processor 320, memory 330, communication interface 370, and/or the like) may receive information indicating that a universal integrated circuit card has been installed in the user device, as described above. In some implementations, the universal integrated circuit card may store a default table that includes network slice selection assistance information, and the network slice selection assistance information may be used to route data from the user device to correct slices of a network associated with the user device. The default table may further include a mapping between information identifying the slices of the network, services provided by the slices of the network, and applications of the user device permitted to utilize the services provided by the slices of the network. The default table may further include information identifying one or more default settings for one or more applications of the user device that are not associated with services provided by the slices of the network.

In some implementations, the default table may be stored in non-volatile memory of the user device, a universal subscriber identity module (USIM) directory associated with the universal integrated circuit card, and/or the like. In some implementations, the user device may configure the user device with the default table that includes the network slice selection assistance information when the information indicating that the universal integrated circuit card has been installed in the user device is received.

In some implementations, the network slice selection assistance information may include a file that includes the network slice selection assistance information, a file that includes user equipment route selection policies, a file that includes a mapping between information identifying the slices of the network and information identifying applications of the user device, and/or the like.

As further shown in FIG. 4, process 400 may include executing an application stored in the user device based on receiving a selection of the application (block 420). For example, the user device (e.g., using processor 320, memory 330, and/or the like) may execute an application stored in the user device based on receiving a selection of the application, as described above. In some implementations, execution of the application causes data to be generated.

As further shown in FIG. 4, process 400 may include identifying a slice of the network to which to route the data based on the network slice selection assistance information included in the default table (block 430). For example, the user device (e.g., using processor 320, storage component 340, and/or the like) may identify a slice of the network to which to route the data based on the network slice selection assistance information included in the default table, as described above.

In some implementations, when identifying the slice of the network to which to route the data, the user device may receive a request to compare information identifying the application and the network slice selection assistance information included in the default table, and may compare, based on the request, the information identifying the application and the network slice selection assistance information included in the default table. The user device may determine, based on a result of the comparing, that the information identifying the application matches application information included in the default table, wherein the application information may be mapped to information identifying the slice of the network to which to route the data. The user device may identify the slice of the network to which to route the data based on determining that the information identifying the application matches the application information included in the default table.

In some implementations, when identifying the slice of the network to which to route the data, the user device may utilize call control messaging to verify that the application is permitted to access a service provided by the slice of the network to which to route the data, and may identify the slice of the network to which to route the data based on verifying that the application is permitted to access the service provided by the slice of the network.

As further shown in FIG. 4, process 400 may include causing the data to be routed to the slice of the network identified based on the network slice selection assistance information included in the default table (block 440). For example, the user device (e.g., using processor 320, memory 330, storage component 340, communication interface 370, and/or the like) may cause the data to be routed to the slice of the network identified based on the network slice selection assistance information included in the default table, as described above. In some implementations, the user device may receive, from the slice of the network and based on the data, a service associated with the application.

In some implementations, the user device may receive, from the network, updated information for the network slice selection assistance information included in the default table, and may update the default table with the updated information. In some implementations, the user device may receive, from the network, newly configured network slice selection assistance information for a public land mobile network (PLMN) of the network, and may replace, in the default table, configured network slice selection assistance information, for the PLMN, with the newly configured network slice selection assistance information for the PLMN. The user device may delete, from the default table, a mapping of associated with the configured network slice selection assistance information for the PLMN, and adding a mapping associated with the newly configured network slice selection assistance information for the PLMN.

Process 400 may include additional implementations, such as any single implementation or any combination of implementations described below and/or in connection with one or more other processes described elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   executing, by a device, an application stored in the device;
   identifying, by the device and based on network slice selection assistance information associated with a network, a network slice to route data generated based on executing the application,
      wherein the network slice selection assistance information is stored on a universal integrated circuit card associated with the device,
      wherein the network slice selection assistance information is mapped to information identifying the network slice, and
      wherein identifying the network slice comprises:
         determining, based on comparing information identifying the application and the network slice selection assistance information, that the information identifying the application matches the network slice selection assistance information; and
   causing, by the device, the data to be routed to the network slice.

2. The method of claim 1, further comprising:
   sending a request for an approval of the application to a toolkit event application associated with the device, wherein the toolkit event application provides the request to the universal integrated circuit card.

3. The method of claim 1, wherein the universal integrated circuit card stores a table that includes the network slice selection assistance information, and
   wherein the method further comprises:
   receiving, from the network slice, a service associated with the application; and
   permitting, based on the table, the application to utilize the service,
      wherein the table includes a mapping between information identifying one or more network slices, one or more services provided by the one or more network slices, and one or more applications of the device that are permitted to utilize the one or more services provided by the one or more network slices.

4. The method of claim 1, wherein the universal integrated circuit card is a first universal integrated circuit card,
   wherein the data is first data,
   wherein the application is a first application,
   wherein the network is a first network,
   wherein the network slice is a first network slice,
   wherein the network slice selection assistance information is first network slice selection assistance information, and
   wherein the method further comprises:
   receiving information indicating that a second universal integrated circuit card is associated with the device,
      wherein the second universal integrated circuit card stores second network slice selection assistance information associated with a second network;
   identifying, based on the second network slice selection assistance information, a second network slice to route second data generated from executing a second application; and
   causing the second data to be routed to the second network slice.

5. The method of claim 1, wherein the universal integrated circuit card stores a table that includes the network slice selection assistance information, and
   wherein the method further comprises:
   configuring the device with the table based on receiving information indicating that the universal integrated circuit card is associated with the device.

6. The method of claim 1, wherein identifying the network slice to route the data comprises:
   verifying, based on a call control messaging, that the application is permitted to access a service provided by the network slice; and
   identifying, based on the verification, the network slice.

7. The method of claim 1, further comprising:
   receiving, from the network slice, a service associated with the application; and
   causing the application to utilize the service.

8. A device, comprising:
   one or more processors configured to:
   execute an application stored in the device;
   identify, based on network slice selection assistance information associated with a network, a network slice to route data generated based on executing the application,
      wherein the network slice selection assistance information is stored on a universal integrated circuit card associated with the device,
      wherein the network slice selection assistance information is mapped to information identifying the network slice, and
      wherein identifying the network slice comprises:
      determining, based on comparing information identifying the application and the network slice selection assistance information, that the information identifying the application matches the network slice selection assistance information; and
   cause the data to be routed to the network slice.

9. The device of claim 8, wherein the one or more processors are further configured to:
   send a request for an approval of the application to a toolkit event application associated with the device,
      wherein the toolkit event application provides the request to the universal integrated circuit card.

10. The device of claim 8, wherein the universal integrated circuit card stores a table that includes the network slice selection assistance information, and
    wherein the one or more processors are further configured to:
    receive, from the network slice, a service associated with the application; and
    permit, based on the table, the application to utilize the service,
      wherein the table includes a mapping between information identifying one or more network slices, one or more services provided by the one or more network slices, and one or more applications of the device that are permitted to utilize the one or more services provided by the one or more network slices.

11. The device of claim 8, wherein the universal integrated circuit card is a first universal integrated circuit card,
    wherein the data is first data,
    wherein the application is a first application,
    wherein the network is a first network,
    wherein the network slice is a first network slice,
    wherein the network slice selection assistance information is first network slice selection assistance information, and
    wherein the one or more processors are further configured to:
    receive information indicating that a second universal integrated circuit card is associated with the device,
      wherein the second universal integrated circuit card stores second network slice selection assistance information associated with a second network;
    identify, based on the second network slice selection assistance information, a second network slice to route second data generated from executing a second application; and
    cause the second data to be routed to the second network slice.

12. The device of claim 8, wherein the universal integrated circuit card stores a table that includes the network slice selection assistance information, and
    wherein the one or more processors are further configured to:
    configure the device with the table based on receiving information indicating that the universal integrated circuit card has been installed in the device.

13. The device of claim 8, wherein identifying the network slice to route the data comprises:

verifying, based on a call control messaging, that the application is permitted to access a service provided by the network slice; and identifying, based on the verification, the network slice.

14. The device of claim 8, wherein the one or more processors are further configured to:
   receive, from the network slice, a service associated with the application; and
   cause the application to utilize the service.

15. A non-transitory computer-readable medium storing instructions, the instructions comprising:
   one or more instructions that, when executed by one or more processors, cause the one or more processors to:
      execute an application stored in a device;
      identify, based on network slice selection assistance information associated with a network, a network slice to route data generated from executing the application,
         wherein the network slice selection assistance information is stored on a universal integrated circuit card associated with the device,
         wherein the network slice selection assistance information is mapped to information identifying the network slice, and
         wherein identifying the network slice comprises:
            determining, based on comparing information identifying the application and the network slice selection assistance information, that the information identifying the application matches the network slice selection assistance information; and
      cause the data to be routed to the network slice.

16. The non-transitory computer-readable medium of claim 15, wherein the one or more instructions, when executed by the one or more processors, further cause the one or more processors to:
   send a request for an approval of the application to a toolkit event application associated with the device,
      wherein the toolkit event application provides the request to the universal integrated circuit card.

17. The non-transitory computer-readable medium of claim 15, wherein the universal integrated circuit card stores a table that includes the network slice selection assistance information, and
   wherein the one or more instructions, when executed by the one or more processors, further cause the one or more processors to:
      receive, from the network slice, a service associated with the application; and
      permit, based on the table, the application to utilize the service,
      wherein the table includes a mapping between information identifying one or more network slices, one or more services provided by the one or more network slices, and one or more applications of the device that are permitted to utilize the one or more services provided by the one or more network slices.

18. The non-transitory computer-readable medium of claim 15, wherein the universal integrated circuit card is a first universal integrated circuit card,
   wherein the data is first data,
   wherein the application is a first application,
   wherein the network is a first network,
   wherein the network slice is a first network slice,
   wherein the network slice selection assistance information is first network slice selection assistance information, and
   wherein the one or more instructions, when executed by the one or more processors, further cause the one or more processors to:
      receive information indicating that a second universal integrated circuit card is associated with the device,
         wherein the second universal integrated circuit card stores second network slice selection assistance information associated with a second network;
      identify, based on the second network slice selection assistance information, a second network slice to route second data generated from executing a second application; and
      cause the second data to be routed to the second network slice.

19. The non-transitory computer-readable medium of claim 15, wherein the universal integrated circuit card stores a table that includes the network slice selection assistance information, and
   wherein the one or more instructions, when executed by the one or more processors, further cause the one or more processors to:
      configure the device with the table based on receiving information indicating that the universal integrated circuit card has been installed in the device.

20. The non-transitory computer-readable medium of claim 15, wherein the one or more instructions, when executed by the one or more processors, further cause the one or more processors to:
   receive, from the network slice, a service associated with the application; and
   cause the application to utilize the service.

* * * * *